United States Patent

Hamm et al.

[11] Patent Number: 5,746,794
[45] Date of Patent: May 5, 1998

[54] FILTER FOR THE AIR IN THE PASSENGER COMPARTMENT OF A MOTOR VEHICLE

[75] Inventors: Hans-Peter Hamm, Ludwigsburg; Klaus Moessinger, Obersulm, both of Germany

[73] Assignee: Filterwerk Mann & Hummel GmbH, Ludwigsburg, Germany

[21] Appl. No.: 600,827

[22] Filed: Feb. 13, 1996

[30] Foreign Application Priority Data

Feb. 18, 1995 [DE] Germany ............ 195 05 583.7

[51] Int. Cl.$^6$ ............................ B01D 46/52
[52] U.S. Cl. .................. 55/385.3; 55/493; 55/497; 55/499; 454/158
[58] Field of Search ............. 55/385.3, 497, 55/499, 500, 501, 490, 493, 492, 503, 502; 454/158, 156

[56] References Cited

U.S. PATENT DOCUMENTS

| | | | |
|---|---|---|---|
| 2,074,294 | 3/1937 | Woodruff | 55/499 |
| 3,187,489 | 6/1965 | Bauder et al. | 55/500 |
| 3,222,850 | 12/1965 | Hart | 55/501 |
| 4,133,661 | 1/1979 | Strnad | 55/497 |
| 4,135,900 | 1/1979 | Westlin et al. | 55/499 |
| 4,147,524 | 4/1979 | Smith et al. | 55/499 |
| 4,386,948 | 6/1983 | Choksi et al. | 55/499 |
| 4,547,950 | 10/1985 | Thompson | 55/499 |
| 4,692,177 | 9/1987 | Wright et al. | 55/499 |
| 4,725,296 | 2/1988 | Kurotobi | 55/497 |
| 4,925,469 | 5/1990 | Clement et al. | 55/497 |
| 5,213,596 | 5/1993 | Kume et al. | 55/481 |
| 5,554,205 | 9/1996 | Ernst et al. | 454/158 |
| 5,569,311 | 10/1996 | Oda et al. | 55/503 |

FOREIGN PATENT DOCUMENTS

| | | | |
|---|---|---|---|
| 608034 | 7/1994 | European Pat. Off. | 454/158 |
| 634203 | 1/1995 | European Pat. Off. | 55/385.3 |
| 2472944 | 7/1981 | France . | |
| 3514038 | 10/1986 | Germany | 454/158 |
| 3709827 | 10/1988 | Germany . | |
| 4215265 | 11/1993 | Germany . | |
| 4343814 | 6/1995 | Germany . | |
| 63-91117 | 4/1988 | Japan | 55/385.3 |

*Primary Examiner*—Duane S. Smith
*Attorney, Agent, or Firm*—Evenson, McKeown, Edwards & Lenahan P.L.L.C.

[57] ABSTRACT

A filter, particularly for the filtering of the air for a vehicle interior, which includes a filter housing with a clean-air-side basic body, a filter insert, and an unfiltered-air-side cover. The filter insert is arranged between the basic body and the cover. The cover is provided with clamping elements which fix the filter insert in place.

12 Claims, 2 Drawing Sheets

FILTER FOR THE AIR IN THE PASSENGER COMPARTMENT OF A MOTOR VEHICLE

BACKGROUND OF THE INVENTION

This invention relates to a filter, particularly for filtering the air for a vehicle interior, having a filter housing comprising a clean-air-side basic body, a filter insert, particularly one produced from an accordion-folded filter paper, as well as a unfiltered-air-side cover, the filter insert being arranged between the clean-air-side basic body and the unfiltered-air-side cover.

A filter insert for the foregoing use is known from Published German Patent Application No. DE 4,215,265. It comprises a repeatedly folded web made of a layer of filter material, the folds of the web having vertex areas and base areas which each extend essentially transversely with respect to the longitudinal direction of the web and have approximately identical dimensions. The filter insert has a layer which is molded on in the shape of a frame. This layer consists of a mixture of a paper pulp and a hardenable adhesive.

In order to achieve a filtering effect which is as optimal as possible as well as a high rate of air flow, it is necessary that the spacing of the folds of the filter material be maintained as precisely as possible. In the known filter, the distances between the folds are defined solely by the frame shape of the layer. This has the disadvantage that, particularly in the center area of the filter, an undefined condition exists with respect to the fold spacing and the filtering effect is therefore impaired.

Filters are also known in which so-called spacers are impressed into the folds. By means of these spacers, a defined distance is maintained at least between the individual folds. However, these spacers have the disadvantage that they also result in the loss of a certain portion of the effective filter surface.

These disadvantages exist particularly where the filter insert must have unusual dimensions, particularly in the case of very wide or very long filter elements.

SUMMARY OF THE INVENTION

It is an object of the invention to provide a filter which achieves an optimal filtering effect even in extreme cases.

A further object of the invention is to provide a filter which is easy to handle during installation and removal.

These and other objects of the invention are achieved by providing a filter for filtering the air for a vehicle interior, comprising a filter housing comprising a clean-air-side basic body, a filter insert, and an unfiltered-air-side cover, the filter insert being arranged between the clean-air-side basic body and the unfiltered-air-side cover, and the cover comprising clamping elements which fix the filter insert in a defined position.

The advantage of the filter of the invention is that, because of additional clamping or holding elements, the filter element is maintained in a predefined position. These clamping elements are advantageously arranged on the filter housing and on the cover and engage the filter insert.

In one advantageous embodiment of the invention, these clamping or holding elements are sword-like holders which are received in pockets of the accordion-folded filter insert.

Particularly in the case of a filter insert which is significantly longer than it is wide, it is necessary to position the filter insert in a precise manner in order to avoid sealing problems. In the case of very long filter inserts, there is also a danger that when the filter insert is installed in the filter housing, because of the elasticity of the frame the length of the filter will not correspond to the length of the housing. In this case also, it is advantageous to fix the position of the filter insert by means of sword-like holding devices.

In accordance with another embodiment of the invention, the cover is provided with a plug-type hinge. As a result, it can be exchanged rapidly and can be assembled to the basic body in a simple manner.

In accordance with one preferred embodiment, the filter insert comprises a foamed-material element. The foamed-material filter element is provided with pockets so that it can be received on the sword-like holders. The foamed-material element is particularly suitable for containing activated carbon. Naturally, other substances having an effective filtering action may also be embedded in the element.

These and other features of preferred embodiments of the invention, in addition to being set forth in the claims, are also disclosed in the specification and/or the drawings, and the individual features each may be implemented in embodiments of the invention either individually or in the form of subcombinations of two or more features and can be applied to other fields of use and may constitute advantageous, separately protectable constructions for which protection is also claimed.

BRIEF DESCRIPTION OF THE DRAWINGS

The invention will be described in further detail hereinafter with reference to illustrative preferred embodiments shown in the accompanying drawings in which.

DETAILED DESCRIPTION OF PREFERRED EMBODIMENTS

Figure 1:
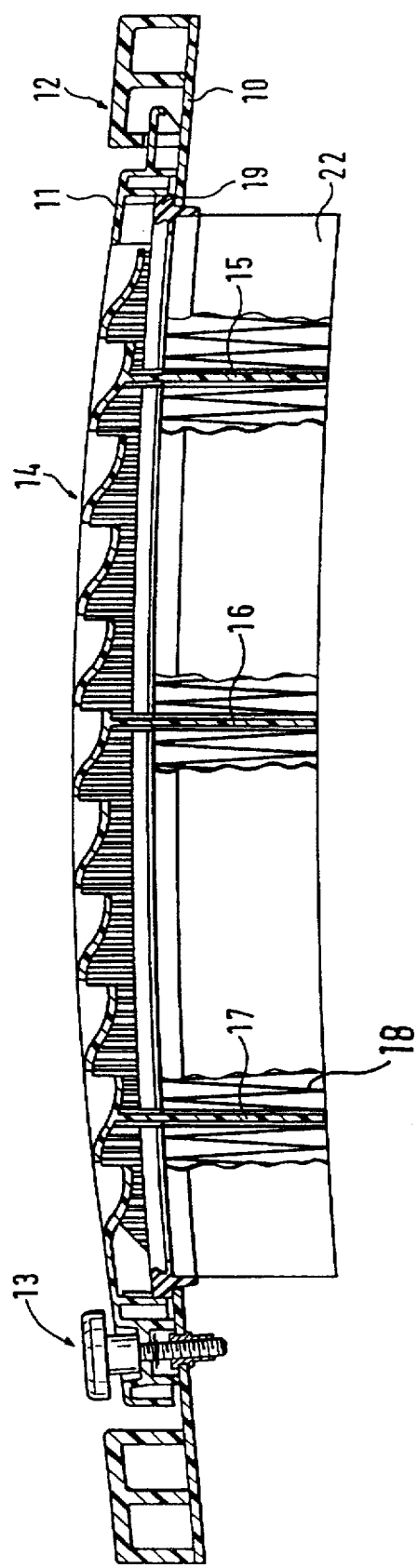
FIG. 1 is a longitudinal sectional view of a filter according to the invention.

The filter according to FIG. 1 comprises a basic body 10 on which a cover 11 is arranged. On the right end, the cover 11 has a plug-type hinge 12. On the left end, a quick-clamping closure device 13 is provided. The cover is provided with lamellar or louvered inlet openings 14. A plurality of prong-like or sword-like holders 15, 16, 17, also are arranged on the cover. These holders engage in an accordion-folded filter element 18. The filter element 18 is provided with a surrounding sealing lip 19. This sealing lip rests on the basic body 10 and is held in place by the cover 11. During the mounting of the filter insert 18, this filter insert 18 is first fitted onto the sword-like holders 15 to 17, and subsequently the preassembled cover/filter assembly is secured to the basic body 10 by the plug-type hinge 12 and quick closure device 13.

The proper position for the sword-like holders on the filter insert may be indicated, for example, by markings on the filter insert. This facilitates correct mounting of the filter insert.

Figure 2:
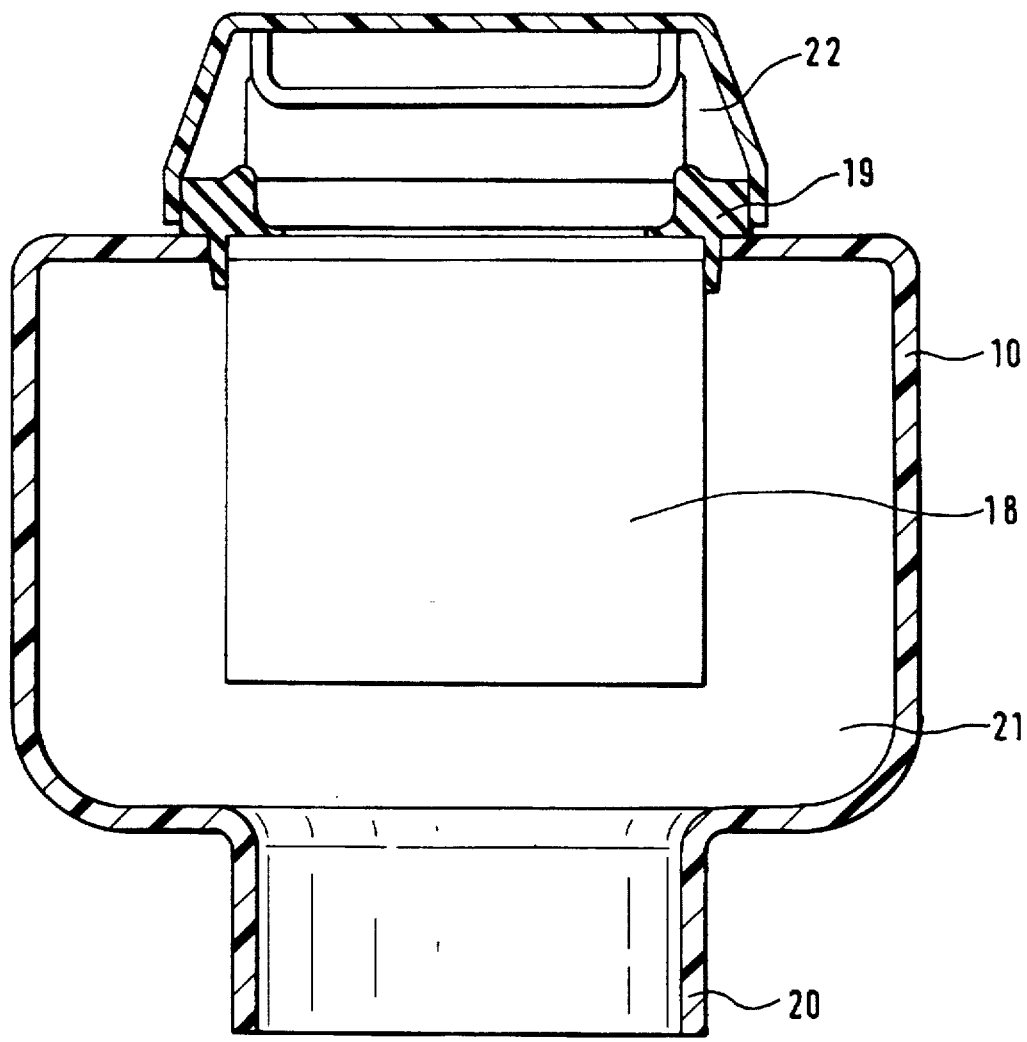
FIG. 2 is a cross-sectional view of the filter of FIG. 1.

FIG. 2 is a cross-sectional view of the basic body 10 with the outlet 20 for the filtered air. The filter insert 18, which by means of its sealing lip 19 separates the clean-air space 21 from the unfiltered-air area 22, extends inside the basic body. In the embodiment of FIG. 2, the filter element 18 may comprise a foamed material. If desired, the foamed material may contain an adsorbent material such as activated carbon.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations falling within the scope of the appended claims and equivalents thereof.

What is claimed is:

1. A filter for filtering the air for a vehicle interior, comprising a filter housing comprising a clean-air-side basic body, a filter insert comprising an accordion-folded filter element, and an unfiltered-air-side cover, said filter insert being arranged between the clean-air-side basic body and the unfiltered-air-side cover, said cover comprising a plurality of holder prongs which engage in respective pockets of the accordion-folded filter element, and wherein said filter element is held by prongs extending from only the unfiltered-air-side of the filter.

2. A filter according to claim 1, wherein said unfiltered-air-side cover is provided with a plug hinge on one side and with a quick-clamping closure device on the other side.

3. A filter according to claim 1, wherein said filter insert comprises a foamed-material element.

4. A filter according to claim 3, wherein said foamed-material element contains activated carbon.

5. A filter according to claim 1, wherein each of said holder prongs extends essentially perpendicular to said cover and engages a single one of said pockets.

6. A filter according to claim 1, wherein each of said holder prongs engages said respective pocket proximate a fold vertex of said pocket which faces said cover.

7. A filter according to claim 1, wherein said cover defines a plurality of inlet openings to allow air to pass therethrough.

8. A filter for filtering the air for a vehicle interior, comprising:

a housing defining an opening between an unfiltered-air side and a clean-air side;

a filter insert arranged in said opening, said filter insert including an accordion-folded filter element having a plurality of folds with adjacent of said folds meeting at a respective fold edge; and a cover arranged to cover said filter element on said unfiltered air side of said housing, said cover including a plurality of holder prongs, each of said holder prongs extending between adjacent of said folds of the filter insert and engaging said respective fold edge, and wherein said filter element is held by prongs extending from only the unfiltered-air-side of the filter.

9. A filter according to claim 8, wherein said cover is provided with a plug hinge on one side and with a quick-clamping closure device on the other side.

10. A filter according to claim 8, wherein said filter insert comprises a foamed-material element.

11. A filter according to claim 8, wherein said cover defines a plurality of inlet openings to allow air to pass therethrough.

12. A filter according to claim 8, wherein each of said holder prongs extends essentially perpendicular to said cover and engages a single one of said fold edges.

* * * * *